Feb. 18, 1930.　　　F. L. SCOTT　　　1,747,395
EARTH BORING DRILL
Filed June 27, 1927

Floyd L. Scott　Inventor

By Jesse R. Stone

Attorney

Patented Feb. 18, 1930

1,747,395

UNITED STATES PATENT OFFICE

FLOYD L. SCOTT, OF HOUSTON, TEXAS, ASSIGNOR TO HUGHES TOOL COMPANY, OF HOUSTON, TEXAS, A CORPORATION OF TEXAS

EARTH-BORING DRILL

Application filed June 27, 1927. Serial No. 201,611.

My invention relates to drills for boring deep wells for water, oil, gas and the like.

It is an object of the invention to provide a drill for deep well drilling which will be of sturdy construction, yet cheap and economical to manufacture and effective in operation.

It is also desired to produce a drill structure which will be easy to assemble, and upon which new cutting elements may be mounted in the field with a minimum of difficulty.

It is also desired to so construct the drill and its cutters that no lubrication is necessary. The invention resides largely in the simple construction and effective arrangement of the cutting elements.

Referring to the drawing herewith, Fig. 1 is a side elevation, of my improved drill, certain parts being in central vertical section for greater clearness.

Like numerals of reference are employed to designate like parts in all the views.

Figure 1:
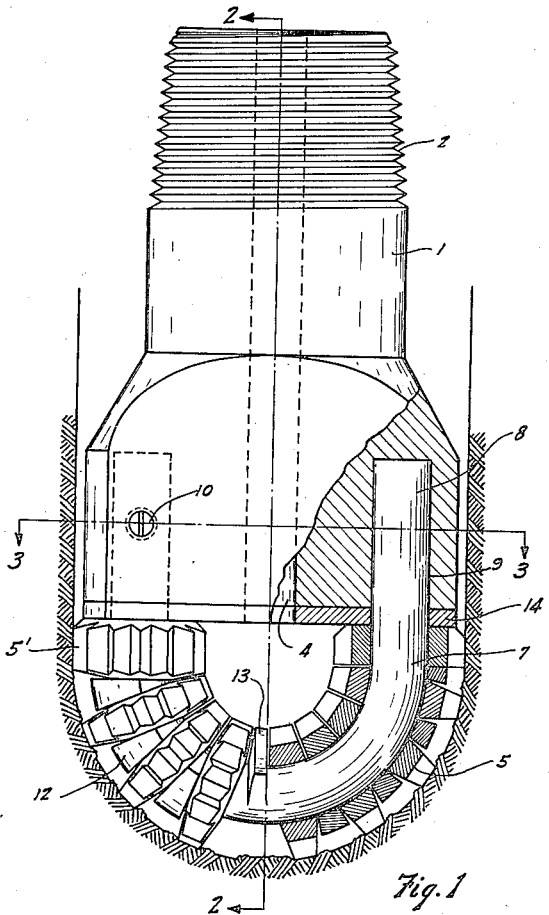
Figure 2:
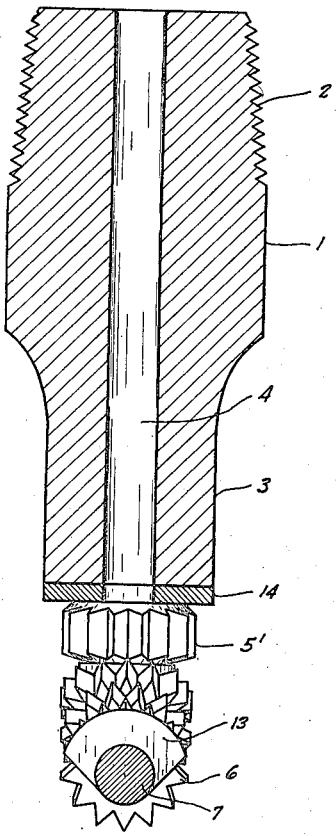
Fig. 2 is a central vertical section of my drill taken on the plane 2—2 of Fig. 1.
Figure 3:
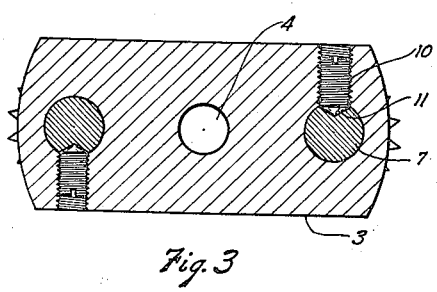
Fig. 3 is a transverse section on the plane 3—3 of Fig. 1.

The head of my drill is one integral block of steel having an upper cylindrical shank 1 tapered and threaded at 2 for attachment to the drill stem by means of a drill collar, not shown. The lower end of the head is flattened on the opposite sides 3 and is widened out laterally as shown in Figs. 1 and 2. The head has a central longitudinal passage 4 therethrough to allow the flow of flushing fluid to the cutters.

The cutting elements 5 are disc shaped cutters, tapering slightly in thickness from the central axis to the outer edge which is toothed at 6.

Said cutters are mounted upon a U-shaped shaft 7, the straight upper legs 8 of which are supported in opposite recesses 9 in the lower end of the head. Set screws 10 or other equivalent means, may be employed to hold the shaft in position in the head. I have shown the ends 8 of the shaft as provided with shallow recesses 11 to receive the ends of the set screws and assure the retaining of the shaft against accidental removal.

The cutters 5 are spaced apart upon the shaft 7 by means of spacer members 12 which are formed by welding to the shaft, wedge-shaped blocks of metal after the cutters have been assembled. A central spacer 13 is formed on the upper side of the shaft slightly off center, as shown, and the cutters are so spaced that there are four cutters shown at one side of the middle and five cutters on the opposite side thereof. Thus the cutters on one side are offset relative to those on the other side and will cut different tracks upon the bottom of the hole. It will be noted that the upper cutters 5 at each side of the drill are slightly thicker than the others and are adapted to cut and maintain the gauge at the side of the hole.

A washer 14 at the lower end of the head acts as a bearing plate for the upper cutters and to protect the lower end of the head. Obviously this washer may be removed and replaced when worn.

In operation, the shaft with its cutters thereon are assembled in the shop as described, and may be quickly mounted in the head by inserting the ends 8 of the shaft into the recesses in the head and then tightening the set screws. When the cutters are in operation they will be immersed in slush and will need no further lubrication. When the cutters are worn and will cut no further, the whole assembly of cutters and shaft may be removed from the head and a new set substituted with little difficulty.

It will be noted that the cutters as mounted are so positioned and inclined that they will roll easily on the botom of the hole, and will hence cut most effectively. The bottom of the hole will be approximately hemispherical and the bit will hence center itself and run smoothly. The cutters being open and unobstructed will be readily cleared of material by the flushing fluid.

The further advantages of the tool will be apparent.

What I claim as new and desire to protect is:

1. A well drill comprising a head with shaft-receiving receses in its lower end, a U-shaped shaft, means to secure said shaft in said recesses, cutters on said shaft below said head, and means on said shaft to space said cutters apart thereon.

2. A well drill comprising a head with shaft-receiving recesses in its lower end, a U-shaped shaft, means to secure said shaft in said recesses, cutters on said shaft below said head, and means on said shaft to space said cutters apart thereon, said cutters being disc-shaped and offset on one end of said shaft relative to those on the other end in the manner described.

3. A well drill comprising a head having a central fluid passage therethrough and opposite shaft-receving recesses extending upwardly therein from the lower end, a U-shaped shaft in said recesses, cutters thereon, and spacing lugs on said shaft between said cutters, the cutters being spaced unevenly apart on said shaft so that each cutter will cut a separate track on the bottom of the hole.

4. A well drill including a head, a single curved shaft, secured on the lower end of said head and projecting in advance thereof, and disc-shaped cutters rotatable on said shaft, said head having a central fluid passage to direct water upon said cutters.

In testimony whereof, I hereunto affix my signature, this the 15th day of June A. D. 1927.

FLOYD L. SCOTT.